United States Patent [19]

Heesch

[11] 3,951,004

[45] Apr. 20, 1976

[54] MULTIPLE POSITION SEAT ADJUSTMENT MECHANISM

[75] Inventor: Max Otto Heesch, Brooklyn, Mich.

[73] Assignee: International Telephone & Telegraph Corporation, New York, N.Y.

[22] Filed: Mar. 20, 1974

[21] Appl. No.: 452,687

[52] U.S. Cl. .............................. 74/89.15; 248/394; 74/424.8 R
[51] Int. Cl.² ........................................ F16H 27/02
[58] Field of Search ................... 74/89.15, 424.8 R; 248/394, 395

[56] References Cited

UNITED STATES PATENTS

| 3,022,035 | 2/1962 | Pickles | 74/424.8 R |
|---|---|---|---|
| 3,033,510 | 5/1962 | Hollar et al. | 248/394 |
| 3,037,735 | 6/1962 | Matthews | 248/394 |
| 3,089,676 | 5/1963 | Pickles | 248/394 |
| 3,123,333 | 3/1964 | De Rose | 248/394 |
| 3,319,921 | 5/1967 | Nichols | 248/394 |
| 3,410,515 | 11/1968 | Posh | 248/394 |
| 3,437,303 | 4/1969 | Pickles | 248/394 |

OTHER PUBLICATIONS

Virgil et al. – Machine Design Elements Of – p. 246.

*Primary Examiner*—Benjamin W. Wyche
*Assistant Examiner*—Wesley S. Ratliff, Jr.
*Attorney, Agent, or Firm*—James B. Raden; Marvin M. Chaban

[57] ABSTRACT

Disclosed is a selectable position adjusting or setting mechanism for a seat for automotive vehicles using an electric motor with multiple armatures or by using separate motors. Action of the motor is transmitted through respective drives to lead screws to translate the seat horizontally, to raise or lower the front end of the seat and to lower or raise the rear end of the seat. The motor action is transmitted to three parallel lead screws to drive these individual lead screws and result in three types of seat movement. To provide speed for the horizontal movement, a lead screw having a very high lead or pitch is used. In addition, the operative members of the mechanism are mounted compactly providing a comparatively short, low profile design.

4 Claims, 7 Drawing Figures

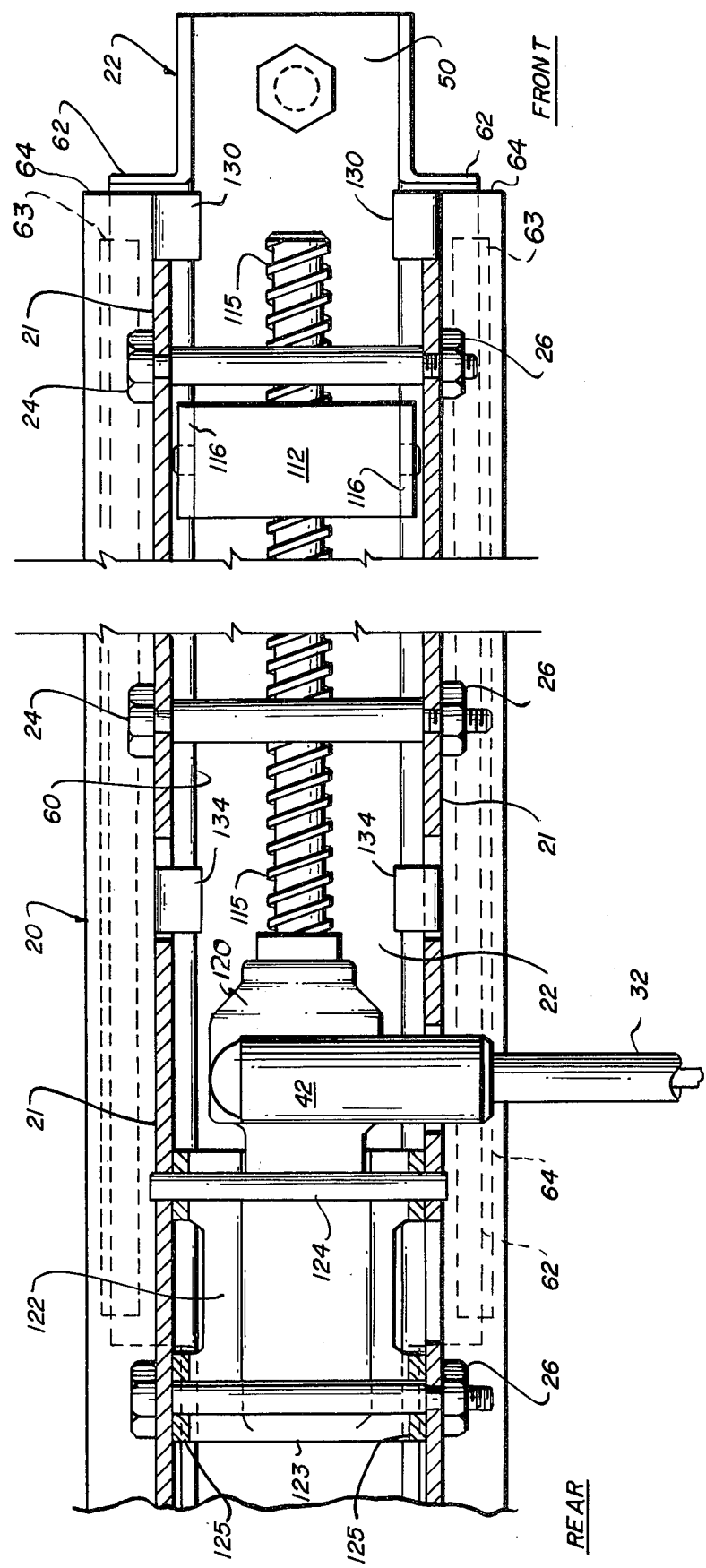

MULTIPLE POSITION SEAT ADJUSTMENT MECHANISM

BACKGROUND OF THE INVENTION

Mechanisms for the powered adjustment or position setting of automotive seats are well-known in the art. The power in many cases is supplied by separate motors, one for each movement. More recently, a single, reversible motor with plural armatures individually selectable has been used to provide the power. By using this approach or by using separate motors, a compact low silhouette mechanism is possible. Toggle switches or the like selectably control the operation of the motors to provide forward or reverse horizontal movement, and independent raising or lowering of the front and rear ends in the vertical direction.

To provide the drive from the motors to the output mechanisms, various types of mechanical linkages have been used. Most recently, these mechanisms have used drive cable members operated by the respective motors to rotate gear trains. For example, in U.S. Pat. No. 3,437,703 to J. Pickles dated Apr. 8, 1969, a rack and pinion mechanism is driven to produce the horizontal movement. Worm and threaded shaft engagement are frequently used to produce both vertical movements from the respective drive cables.

SUMMARY OF THE INVENTION

The present invention provides three types of seat motion: vertical tilting movement of the front edge of the seat, vertical tilting movement of the rear edge of the seat, and horizontal translatory movement of the entire seat mechanism. These movements are all generated by lead screw mechanisms individually driven by drive cables of motor mechanisms of the generally known and used types.

Both vertical movements are produced by lead screws rotated by individual worm gears. The lead screws travel within threaded drive block members, the members being secured in one end of a bell crank mechanism, the other end of the bell crank carrying the seat support member.

A lead screw having an Acme thread and large lead ratio or pitch is used to produce the horizontal movement at a high rate responsive to movement of the lead screw at a comparatively slow speed. One lead screw end is mounted within a threaded drive block, the block being connected to rail members captured within horizontal tracks. The rails are secured to the seat base to move the seat in the forward or reverse direction responsive to movement of the lead screw.

It is therefore an object of the invention to provide a power driven, six-way seat mechanism in which all the movements are generated by lead screw and threaded drive block engagements.

It is a further object of the invention to provide a powered seat for a vehicle with powered, longitudinal, horizontal movement being generated by a lead screw driving a threaded member within a horizontal track.

It is a further object of the invention to provide a powered seat mechanism in which plural, parallel lead screws are mounted in a compact apparatus to provide the output power drives.

It is a still further object of the invention to provide a vehicle multiple powered seat mechanism using essentially identical power transferring members to produce quiet dependable operation.

Other object, features and advantages of the invention will become apparent from the following specification viewed in conjunction with the drawings which are described briefly next.

BRIEF DESCRIPTION OF THE DRAWINGS

FIG. 7 is a section taken along line 7—7 of FIG. 1.

DETAILED DESCRIPTION OF THE DRAWINGS

Figure 1:
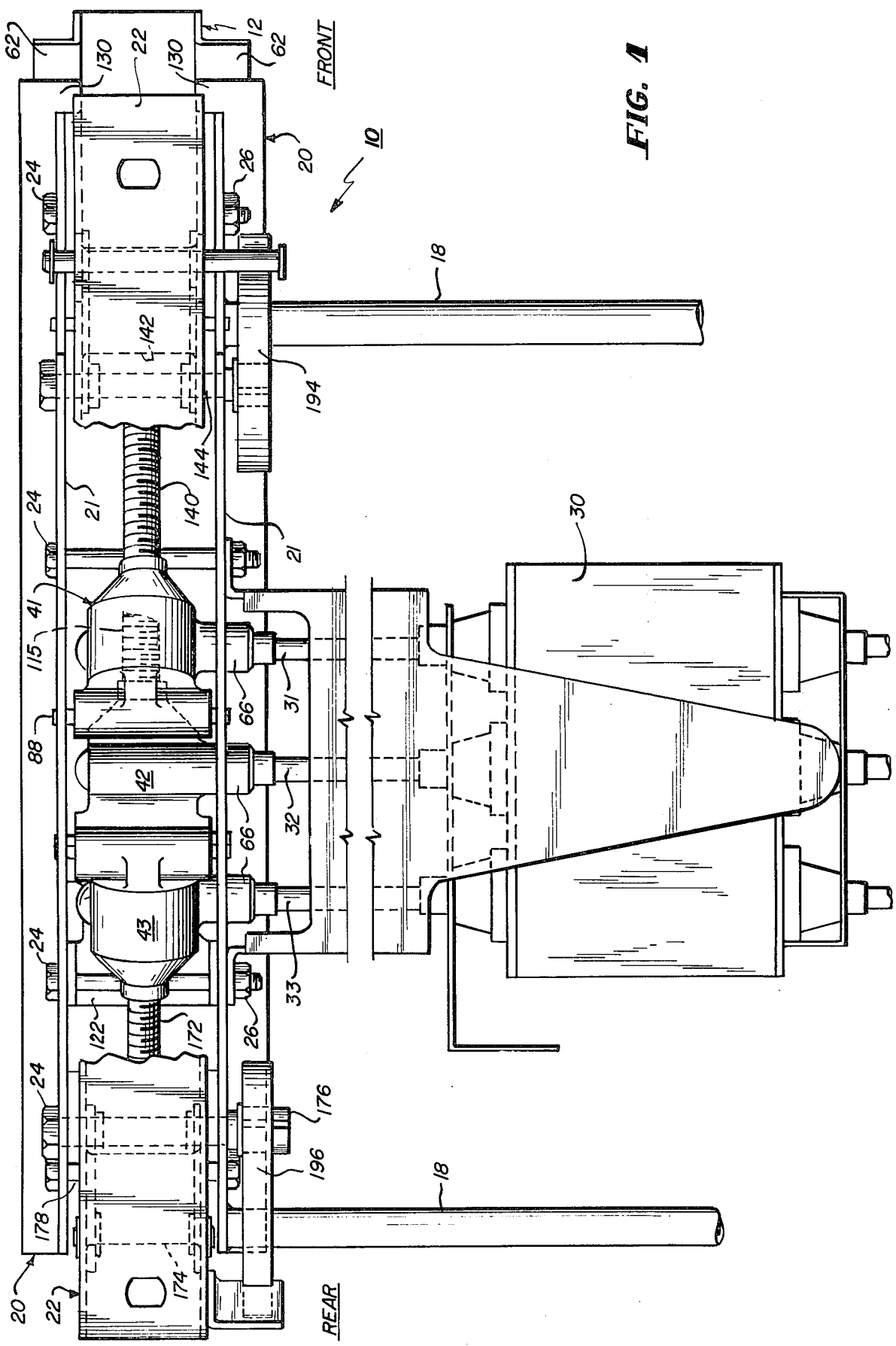
FIG. 1 is a plan view of a mechanism employing a preferred embodiment of my invention with the top member partially broken away to show the interior thereof.
Figure 2:
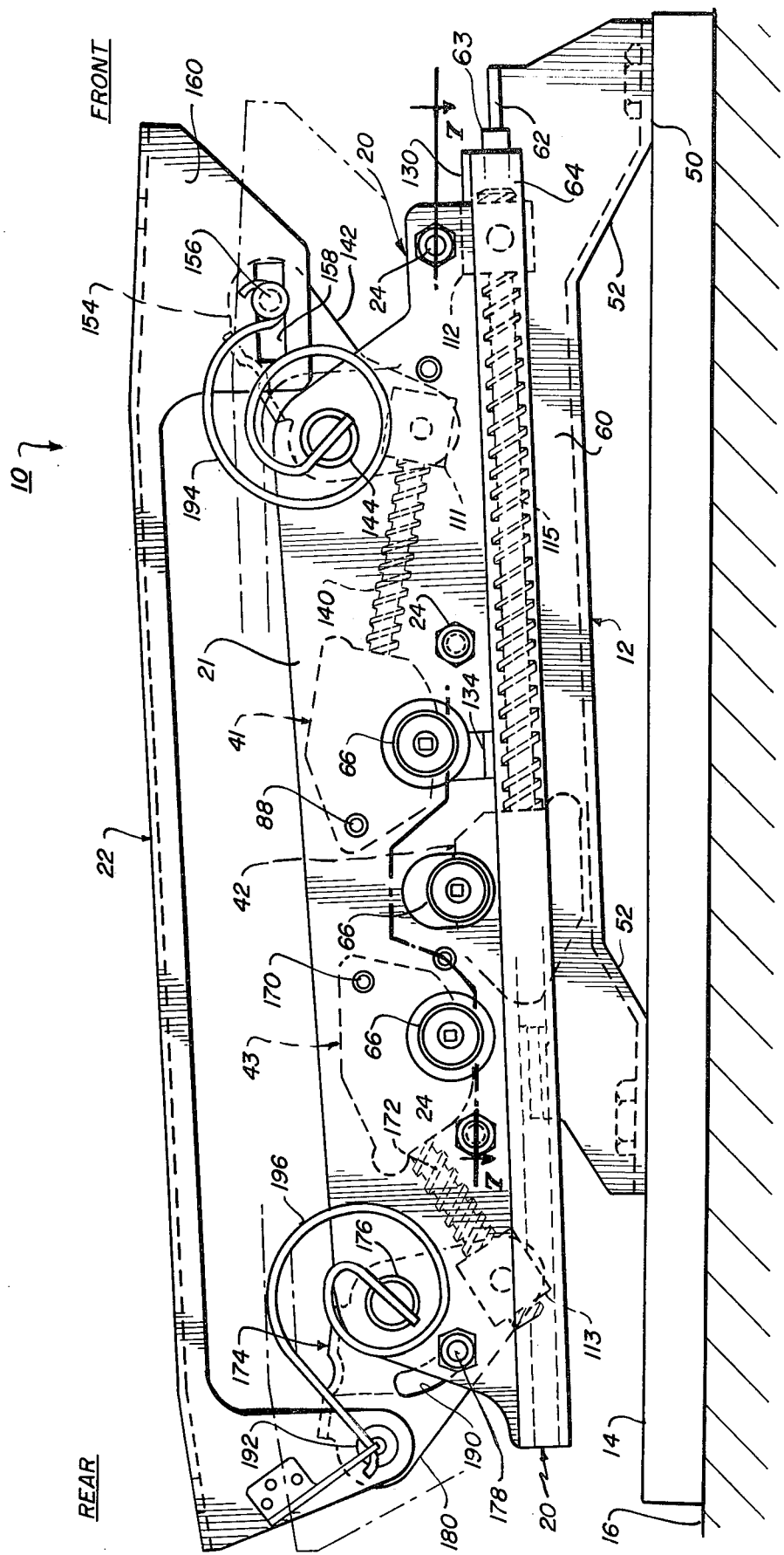
FIG. 2 is a side elevational view of the mechanism of FIG. 1 of my invention.
Figure 6:
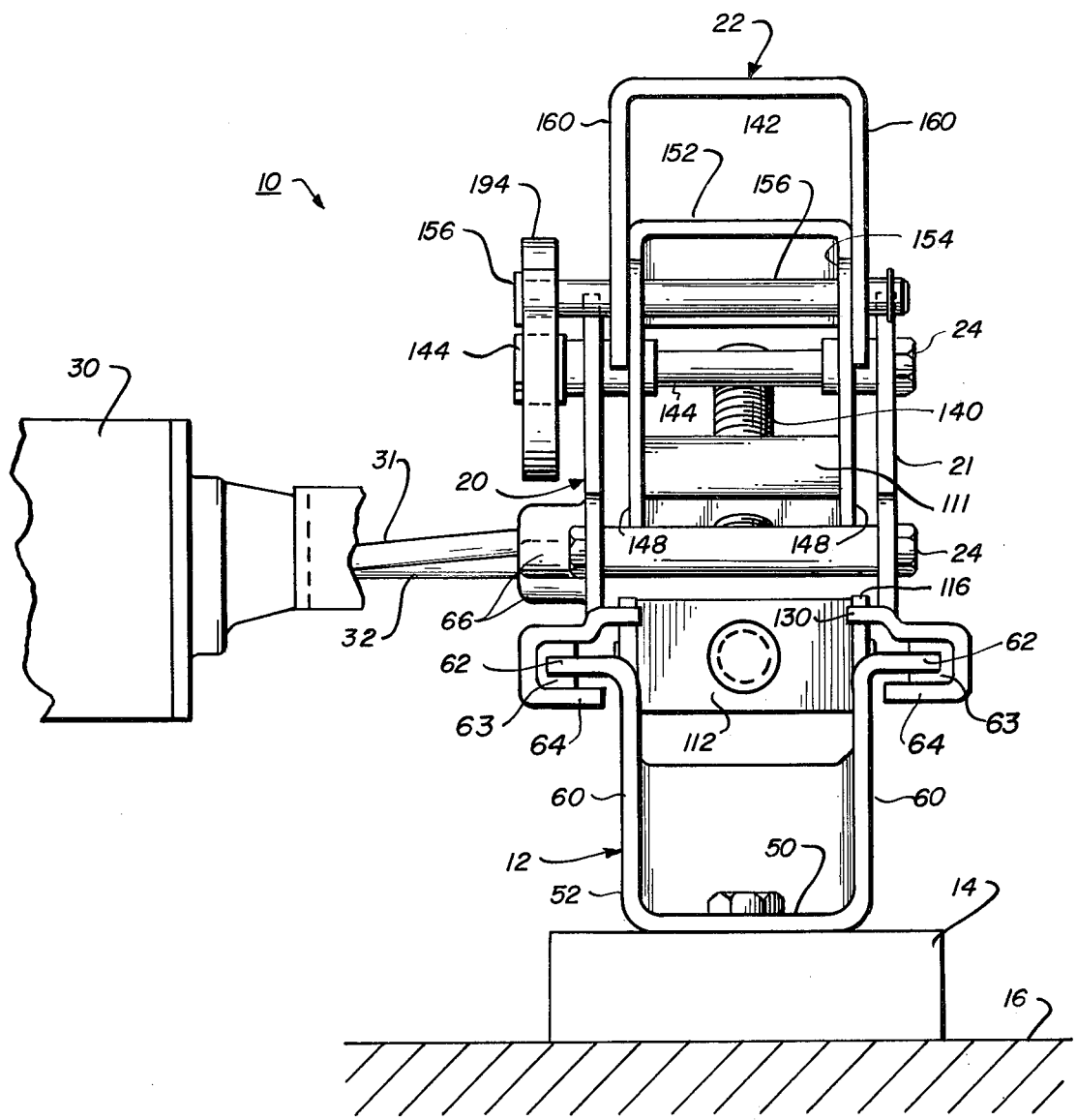
FIG. 6 is a front end view of the mechanism of FIG. 1.

In FIGS. 1, 2 and 6, I show a mechanism 10 employing a preferred embodiment of my invention. The mechanism has a generally U-shaped structural mounting base 12 which is suitably affixed by bolts or the like to a beam 14, the beam being secured permanently to the floor 16 of the vehicle. In known fashion, a second mechanism (not shown) is also mounted to the vehicle floor and spaced a lateral distance from the mechanism 10 to receive and support a vehicle seat between the two mechanisms. The second mechanism may be generally a mirror image of the mechanism shown herein when employed on certain types of vehicle seats, i.e., bench seats. Where th distance between the two mechanisms is small, such as a split bench seat or bucket seat extending only a fraction of the width of the vehicle, various known modifications may be applied to the other mechanism, such as the use of torsion bars indicated in FIG. 1. Other known combinations, of course, may be used.

The major structural elements of the mechanism 10 are the mounting base 12 which is affixed to the stationary floor structure of the vehicle; and a longitudinally translatable carriage 20 which is secured to the seat. The carriage is generally comprised of sidewalls 21 and a seat securing members 22 which may be pivoted at its both longitudinal ends by action of the carriage member. Translatory motion of the carriage member 20 produces longitudinal movement of the seat while the front and rear end pivotal motion of the carriage produce vertical or tilting movement of the seat securing member 22 and consequent movement of the front and rear end of the seat respectively.

As can be seen in FIGS. 1, 2, 6 and 7, there I show a three-output shaft motor 30 of a type well-known in the art supported intermediately between the mechanism 10 and its counterpart mechanism (not shown) at the other side of the seat. Suitable individual motors could also be used. The three output shafts 31, 32 and 33 of the motor are connected to respective drive assemblies in each mechanism, the one shown in FIG. 2 and the one not shown which could be connected to the opposite ends of shafts 31, 32 and 33 are mentioned previously.

The motor shafts 31, 32 and 33 each drive an internal drive cable within an enclosing flexible tube, the cable and tube being of known design. The internal cable for each motor engages a suitable driven shaft 35 within the enclosing socket 36 of the gear box 40. The gear boxes of the three drive assemblies called front gear box 41, translatory gear box 42 and rear gear box 43 herein are essentially identical in internal construction and operation, the external housing of the translatory box 42 being different for mounting purposes. The engagement of each shaft cable with the driven shaft within Socket 36 is disengageable as is well-known in the art to permit component replacement and the like.

The mounting base 12 of the mechanism is a unitary, rigid structural member having a generally U-shaped cross section as viewed from the front (FIG. 6) or as viewed from the rear. The web of the base section 50 serves as the mechanism mounting feet 52 at both the front and the rear, the central section being raised between the feet as shown most clearly in FIG. 2. Suitable apertures or mounting holes (not shown) in the web of the feet allow the mechanism 10 to be mounted to suitable floor support structure of the vehicle.

The sides 60 of the U-shape of the mounting base are parallel and terminate in outwardly facing horizontal rail members 62. The rail members are discontinuous for a short distance within the central areas of the mechanism, the base walls being formed vertically upwardly in the discontinued areas for mounting purposes, as will be explained. Suitable nylon glides 63 are mounted and may be adhered to these rail members to provide a continuous sliding medium between the rail members 62 and the inwardly open channel members 64 within these rail members are constrained. The channel members 64 form the lower extremity of the carriage sidewalls 21. The carriage essentially comprises two upstanding perimeter walls 21 joined together structurally by reinforced studs, bolts 24 and mating nuts 26. The operative assemblies are all secured to the carriage walls within the area enclosed by the carriage walls.

The carriage walls 21 are upstanding members of approximately the same length as the mounting base, with the carriage being slidable longitudinally relative to the base due to the rail within channel engagement.

To provide the three basic movements, there are provided three separate motor sections, each of which rotates a respective one of the drive shafts 31, 32 and 33. Each drive shaft engages an inner rotatable member within the stationary receiver socket 36. Each socket 36 has a horizontally disposed opening, enclosed by suitable open-ended tube members 66 which protrude through suitably sized openings in the carriage walls 21. Each socket tube 66 is integral with a respective one of the individual housings 70 of the gear boxes, one such gear box being provided for each basic type of movement.

Figure 3:
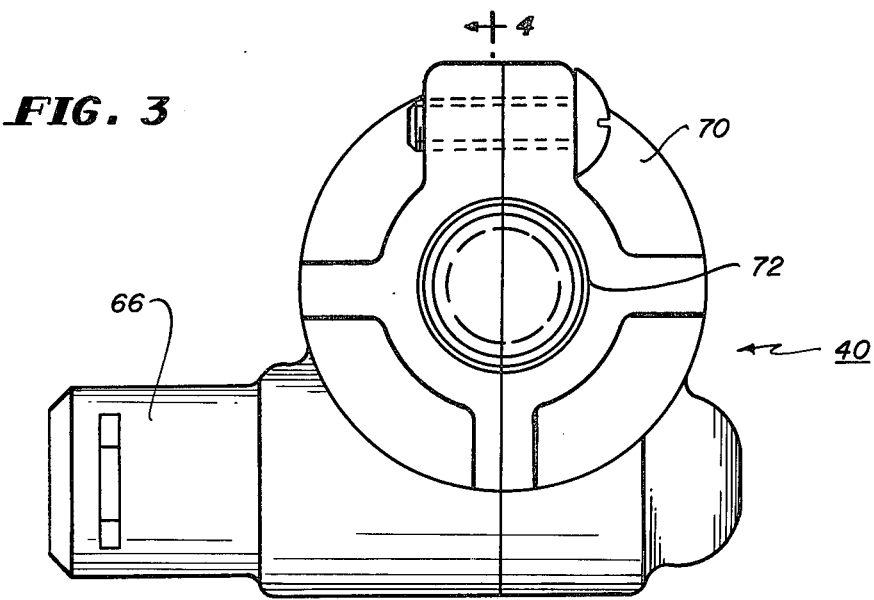
FIG. 3 is an end view of a typical drive unit assembly as used herein.

In FIG. 3 is shown the external configuration of a typical gear box housing 70 which is essentially cylindrical and has a driven lead screw 72 axially disposed relative to the axis of the cylinder of housing 70. The lead screw is journaled for rotation within suitable bearings in the housing. At the innermost end of the lead screw a thrust ball bearing 80 is inset in a recess 82 in the inner end of the lead screw. The thrust bearing 80 bears against a laterally disposed thrust disc 84 resting against the gear box housing, the end of the lead screw being spaced from the wall 84 by the thrust bearing.

Figure 4:
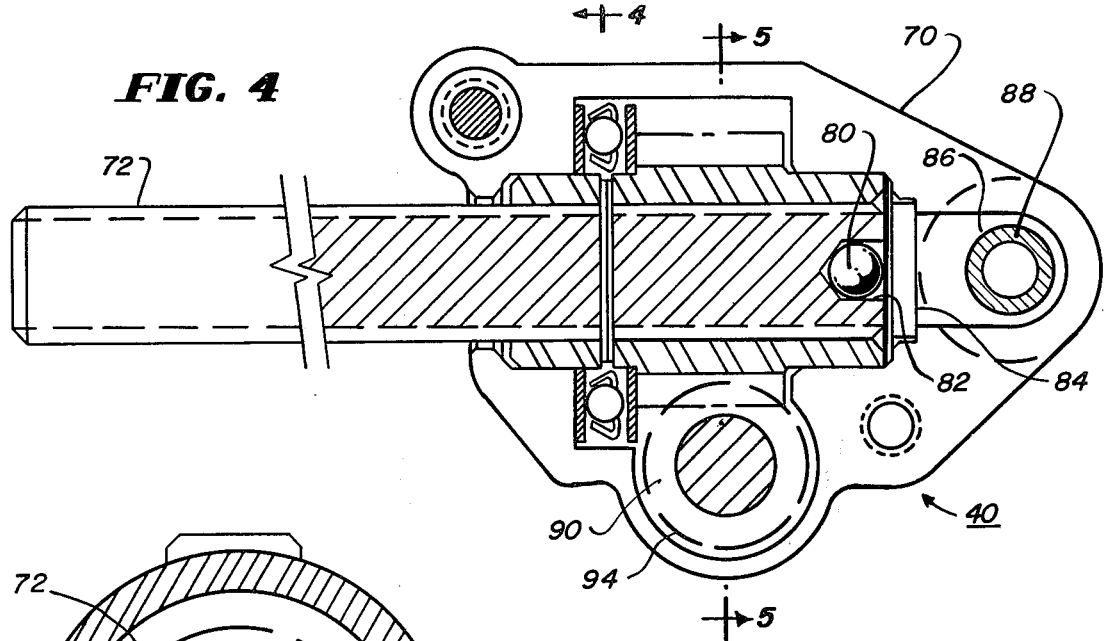
FIG. 4 is a section taken along line 5—5 of FIG. 4.
Figure 5:
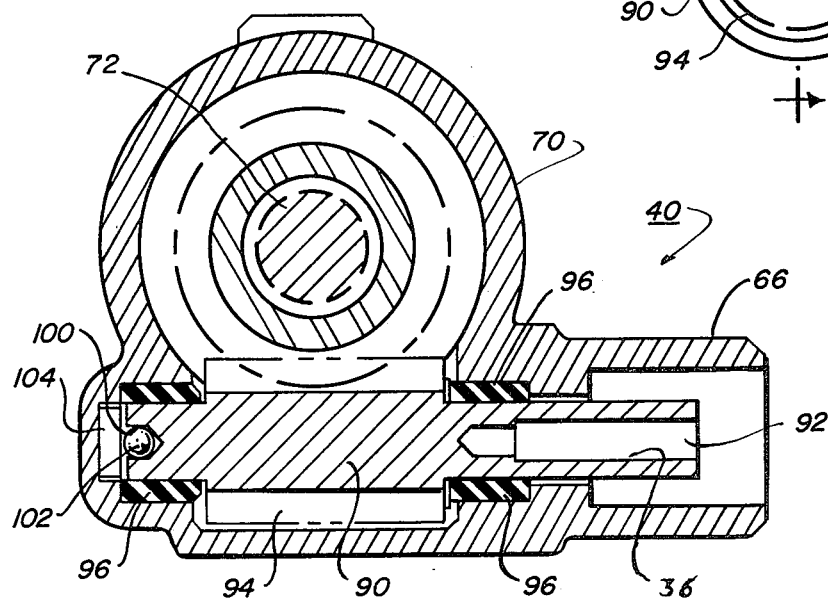
FIG. 5 is a section taken along line 6—6 of FIG. 5.

Also along this central axis of the housing 70 and spaced from the thrust bearing is the centerline of a laterally extending mounting tube receiver 86 (FIG. 4), the mounting tube receiver being perpendicular to the lead screw. The mounting tube receiver accepts a mounting tube 88 for affixing and positioning the gear box relative to the carriage walls 21. The mounting tube 80 is tightly fitted in the receiver and mounts into suitable circular openings in the carriage walls to allow rotational movement of the gear box about the mounting tube 80 and the carriage walls. This form of mounting prevents all movement of the gear box except in the rotational sense.

Within the gear box, and engaged with the lead screw is the motor driven worm gear assembly 90. This gear assembly has suitably shaped drive socket 92 within the open-ended exterior tube 66 in one end for receiving an end of the motor driven shaft. The socket may preferably be square or hex, as indicated for engagement with a particular drive cable shape. The socket may be integral with or firmly secured to a helical worm 90. Intermediate along the length of the worm are the gear teeth 94 meshing with the driven worm gear 95. The worm gear 95 is coaxially mounted about the lead screw and is pinned thereto for joint motion. Suitable sleeve or roller bearings 96 are provided adjacent the ends of the worm at both ends of the worm externally of the teeth within the housing. At its inward end, a shaped recess 100 in the drive shaft houses a thrust ball bearing 102, the bearing 102 normally resting against or adjacent to a thrust reactive disc 104 within an enclosing wall of the housing. The thrust bearings and reactive discs combine to provide a mechanism operable in a very quiet manner.

Each lead screw extends out of its gear box housing freely for a distance prior to its entry into an essentially rectangular, threaded drive block, one such drive block being provided for each lead screw. Thus, there is a front vertical movement drive block 111 near the front of the mechanism, an intermediately positioned horizontal movement drive block 112, and a rear end vertical movement drive block 113 adjacent the rear of the mechanism.

As can be seen best in FIG. 7, the horizontal drive block 112 is secured at its lateral sides to vertical extension 116 of the sidewalls 60 of the stationary base 12. The gear box housing 120 for the horizontal movement is affixed to the sidewalls 21 of the slidable carriage member 20 by means of an elongated mounting platform 122 including an elongated supporting web 123 and support walls 125 fixed at two points to each carriage sidewall 21 to prevent rotation of the platform and gear box. The platform 122 is firmly secured to the gear box 120 by screws 124 or the like.

Thus, when output shaft 32 is rotated to rotate the worm and worm gear within gear box 120, the lead screw 115 is advanced in the resultant direction accordingly. The lead screw 115 turns within the drive block 112 as a result. The block 112 being affixed to the stationary base 12 cannot move. Thus, the gear box 120 is advanced, the gear box carrying with it the carriage assembly 120. Movement of the carriage assembly horizontally carries with it the vehicle seat.

Further, as can be seen in FIG. 7, the vertical extensions 116 used to support the horizontal drive block extend within the area traversed by the stop flange members 130 of the carriage. As can be seen in FIG. 2, these flange members will engage the extensions 116 and the front wall of the drive block 112 at one longitudinal extreme condition of carriage movement to prevent further movement in that direction. Thus a positive limit stop is provided against further rearward carriage movement.

To provide a positive rearward carriage limit stop, tab members 134 are provided. These tab members comprise inwardly folded sections of the carriage walls 21 beneath the front end motor shaft opening 36. The carriage walls 21 beneath the opening 36 are slitted to provide a foldable tab member 134 at each side of the mechanism. At the forward travel limit of the carriage, the tab members 134 engage the front edge of the drive block 112 and prevent further forward movement.

To provide the necessary speed of movement and power for the translatory horizontal movement, the lead screw 115 used to generate the horizontal movement has an Acme thread with a one-half inch lead. Thus for each complete revolution of lead screw 115, the carriage is moved forward one-half inch, with its full travel path being approximately 6 inches.

To provide the vertical movement of the front end of the seat, gear box assembly 41 is employed. This gear box assembly has a driven lead screw 140 inclined downwardly from its mating with the worm gear box to mate with suitably threaded drive block 111. Drive block 111 is secured to one end of bell crank assembly 142. This bell crank 142 is pivotally secured to the carriage walls 21 at its intermediate section by pivot rod 144. The other end of the bell crank has a lost motion connection to the seat securing member 22. The bell crank assembly 142 includes a unitary pivotal bracket member 146 including two depending arms 148 straddling the drive block and affixed thereto allowing relative rotational movement between the drive block and the bracket member. The arms 148 are pivotal about pivot pin 144, the pin extending through the carriage sidewalls. The bracket member 146 has a transverse structural support web 152 leading to upper bracket arms 154. Circular openings through these arms receive a transverse pin 156, the pin also riding within a generally horizontal slot 158 in one wall 160 of the seat securing member 22.

Rotation of the front vertical drive motor shaft 41 advances or retracts the lead screw 140 to pivot the lower end of the bell crank bracket 146. The bracket is pivoted relative to the carriage walls to cause movement of pin 156 and the seat support in a generally vertical direction.

The vertical drive for the rear end is generally similar in its principle of operation to that of the front end. The rear end gear box 43 is pinned to the carriage walls 21 as generally described previously allowing limited angular movement of the gear box about the intermediate mounting pin 170. The output of the gear box is directed through lead screw 172. The lead screw 172 is inclined downwardly from the gear box 170 for a distance prior to its mating with rear drive block 113. This drive block controls the movement of a bell crank mechanism, bell crank 174.

Bell crank 174 is pivotal about a rod 176 extending through the carriage sidewalls, and at its upper end the bell crank is connected by suitable pins 178 to the extensions of vertical sidewalls 160 of seat securing member to pivot the seat securing member accordingly. Similar to the front bell crank, the rear bell crank is unitary in construction, has depending arms 180 straddling the rear drive block and being connected thereto. The bell crank 174 has a transverse support web 182 leading to its connection to the sidewalls 160 at pins 184 in upper sections of arms 180, the arms being continuous to provide both lower and upper sections. One of these arms has a lost motion connection to the carriage walls by an arcuate slot 190 in one arm 180, with rod 192 affixed to the carriage walls riding in the slot. This assembly constrains the rear end of the seat to a curvilinear motion essentially in a vertical direction.

Further, there are provided at both the front and rear end, flat or ribbon torsion springs anchoring the mechanism to the seat securing member. These springs, 194 at the front, and 196 at the rear, are supported at one end in the slot 198 of a clevis end of the respective bell crank pivot pins. The other end of the front torsion spring is restrained under the pin 156 which joins the bell crank assembly 142 to the seat support member. The rear torsion spring in a like manner rides in a clevis slot of bell crank pivot pin 176, while the other end of the rear spring rests under the notch 202 in a side extension 204 of the walls 160. These torsion springs are used as a counterbalance to the weight of the seat and a person seated on the seat. These springs are used to offset the effects of seat tolerances to eliminate clicking and other noises.

It should be noted that all such seat mechanisms to be used in automotive production must meet certain governmental and industry standards. These include test load in pounds which must be supported by the various parts of the seat, limits on the speed of operation of the drives, and maximum movements allowable. In addition, a seat support should meet federal restraint standards under impact conditions, and various push and pull forces when in its weakest or all-the-way-up position. The mechanism as described herein meets the presently applied standards fully.

The present invention produces a sturdy, compact mechanism which moves the seat horizontally at a comparatively high rate in response to rotation of the drive gear and lead screw at a comparatively low rate.

To provide these functions, the present invention has been described with what is at present thought to be the preferred embodiment. It is understood that modifications may be made therein, and it is intended to cover in the appended claims all such modifications which fall within the true spirit and scope of the invention.

I claim:

1. A seat adjuster mechanism comprising mechanical structure for slidably moving a seat longitudinally and elevating the front and rear ends thereof, said structure including an elongated seat supporting member, an elongated carriage member over which the seat supporting member is mounted, means tracking said carriage member for longitudinal movement relative to a stationary support, vertically extending longitudinally spaced apart brackets mounted for pivotal motion relative to said carriage member at each end thereof for carrying said seat supporting member with said carriage member, a separate lever centrally pivotally mounted between each bracket and the adjacent end of the seat support member, one end of one of said levers being directly pivotally connected to one end of the seat supporting member, a lost motion pivot connection connecting one end of the other of said levers to the other end of the seat supporting member, a threaded receiver on the other end of the levers, lead screws extending longitudinally of the seat supporting member and inclined inwardly and upwardly for engagement with said threaded receivers to individually pivot said levers to elevate the ends of said seat support member, and a carriage sliding control including a third lead screw engaging a third threaded receiver for controlling the longitudinal advance of said carriage member and said seat support member relative to said stationary support.

2. A mechanism as claimed in claim 1, wherein said carriage sliding control includes a platform secured between sidewalls of said carriage member, said platform defining a web spanning the walls of said carriage member to provide reinforcement therefor, a motor-driven enclosed housing on said platform for driving said last-mentioned lead screw longitudinally with said platform inwardly adjacent one of said levers and the threaded receiver adjacent the other of said levers.

3. A mechanism as claimed in claim 2, wherein said stationary support comprises sidewalls upstanding at the transverse sides of a web, and means on the sidewalls of said support engaging wall members of said carriage member to limit travel of said carriage member.

4. A seat adjustment mechanism comprising means for receiving three flexible drive cables adapted to drive said mechanism, sad cables extending from said mechanism to motor means, with said cable receiving means disposed intermediately along the length of said mechanism; said mechanism including a stationary track comprising opposed sidewalls and an adjoining base web secured to a fixed support, a carriage slide engaged with and movable along said track at both lateral sides thereof, said carriage including upstanding continuous sidewalls extending the full length thereof enclosing said mechanism, a seat supporting member positioned above the carriage for supporting a seat to be adjusted, a first bell crank lever pivotally mounted to said carriage sidewalls adjacent one longitudinal end of said slide adjacent the one end of the seat supporting member, a pivotal connection between the other end of the lever and a threaded receiver driven by said one of the drive cables to pivot said lever, a second bell crank lever pivotally secured to said carriage sidewalls at the other longitudinal end, one end of said bell crank lever connected to the other end of said seat supporting member, the other end of said second lever connected to a threaded receiver driven by another one of the flexible cables, a threaded receiver affixed to said stationary track at one longitudinal end thereof, a platform mounted between the carriage sidewalls at the opposite end of the stationary track, a gear housing mounted on said platform and connected to a third of said flexible cables for driving said platform and carriage slidably along said track relative to said stationary fixed support, each of said threaded receivers including a male-female threaded engagement for advancing a lead screw responsive to drive thereof by said flexible cables, and a plurality of enclosed gear trains, each said train drivably connected to one of said cables to advance or retract one of said lead screws and move said seat support member accordingly.

* * * * *